UNITED STATES PATENT OFFICE.

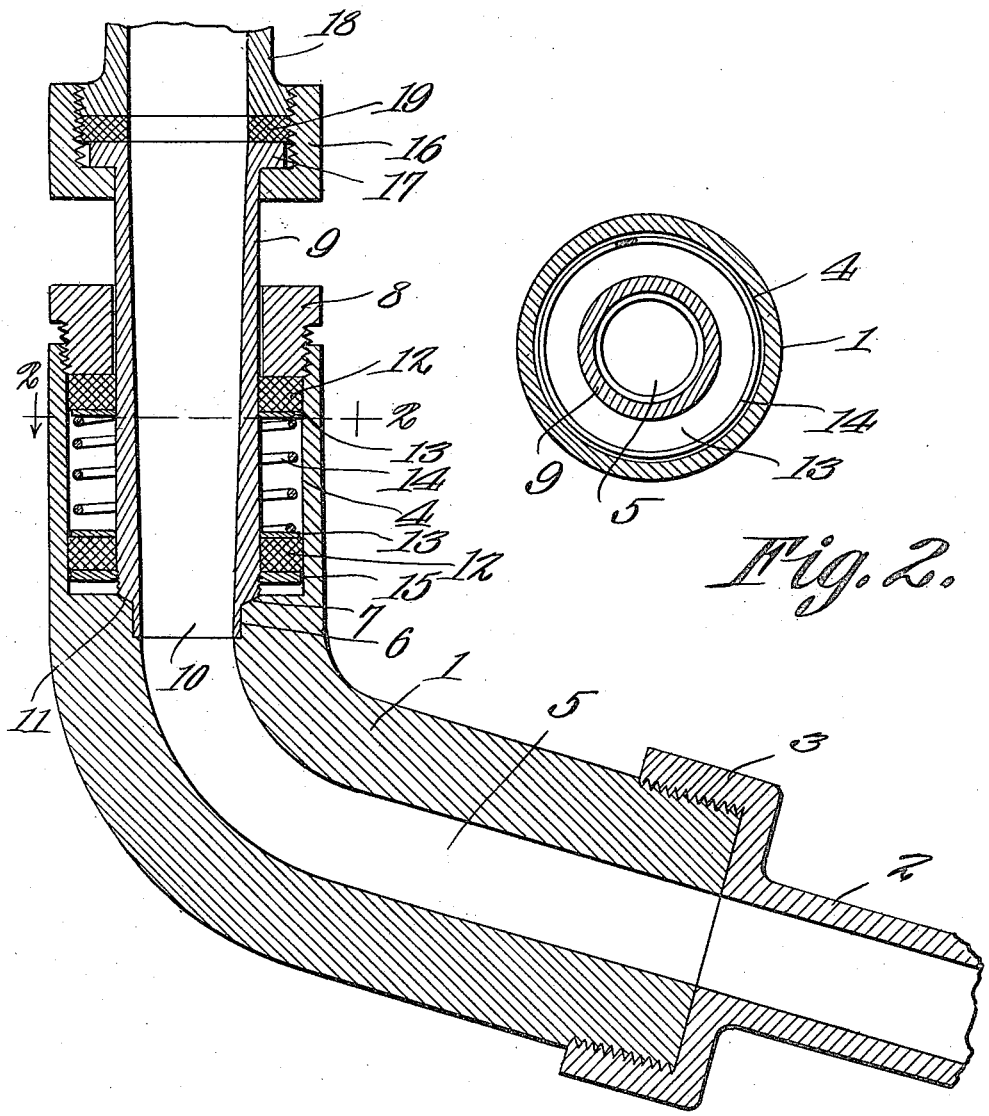

GEORGE P. FRANK, OF ROSELLE, NEW JERSEY.

HOSE-COUPLING.

1,163,995.  Specification of Letters Patent.  Patented Dec. 14, 1915.

Application filed August 5, 1914. Serial No. 855,203.

*To all whom it may concern:*

Be it known that I, GEORGE P. FRANK, a citizen of the United States, residing at Roselle, in the county of Union and State of New Jersey, have invented a new and useful Hose-Coupling, of which the following is a specification.

The present invention appertains to a hose coupler, and aims to provide a novel device for connecting a water or air hose to a hydrant, pipe, spigot, or the like, whereby the hose may move freely relative to the hydrant or other fixed water or air conductor to which the hose is connected, and whereby the hose will not be liable to bend excessively.

Ordinarily, when a hose is connected to a hydrant, faucet, or other fluid conduit, the hose in dropping to the ground, floor or other underlying surface, will have a short bend adjacent the hydrant, or the like, which will in time cause the hose to break or rupture, especially when the hose is moved about.

With the foregoing and other objections in mind, it is the object of the present invention to provide a simple and effective device for connecting the hose to a hydrant or other fixed fluid conduit, which will eliminate the usual short bend in the hose, and which will enable the hose to move freely with respect to the hydrant, or the like, without interrupting the flow of the water or air, and without impairing the present device.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a longitudinal section of the improved hose coupler or connection, and Fig. 2 is a cross section taken on the line 2—2 of Fig. 1.

In carrying out the present invention, there is provided an angular or curved pipe 1, which has its arms arranged at an obtuse angle with respect to one another, so that the formation of the pipe 1 will be such as to enable the hose to be conveniently attached to and dropped from a hydrant or the like.

A hose of any suitable character is adapted to be attached to one end of the pipe or member 1, and to this end, a nipple 2 is provided upon which the end of the hose may be secured or clamped, and as illustrated, the nipple 2 is provided with a threaded socket 3 at one end engaged over the end of the corresponding arm of the pipe 1. It is to be understood, however, that various means may be provided for attaching the hose to the pipe or member 1. The other end or arm of the pipe 1 is provided with a counter-bore or socket 4 which provides a stuffing box at the corresponding end of the bore or passage 5 of the pipe 1, and at the bottom or inner end of the counter-bore or stuffing box 4, the bore 5 has a slightly enlarged portion 6, and the elbow has a beveled annular seat 7 between the bottom of the counter-bore or stuffing box 4 and the enlarged portion 6.

An annular or gland nut 8 is threaded into the mouth of the counter-bore or stuffing box 4, and a tubular member 9 is slidable through the nut 8, and is provided with a reduced end portion 10 which fits snugly and slidably in the enlarged portion 6 of the bore 5, while the shoulder provided by the reduced end portion 10 is beveled, as at 11, to snugly fit against the seat 7.

A pair of annular compressible packing rings 12 embrace the tubular member 9 within the stuffing box 4 and snugly engage the interior walls of the stuffing box 4, and flat rings 13 are disposed slidably upon the tubular member 9 between the packing rings 12 to seat thereagainst. A coiled wire expansion spring 15 surrounds the tubular member 9 within the stuffing box 4 and between the rings 13, to separate the said rings 13 and to cause them to forcibly seat against the packing rings 12 for compressing the same. A retaining ring 15 is secured upon the tubular member 9 adjacent the reduced end 10 thereof and is spaced from the bottom of the stuffing box, for holding the parts 12, 13 and 14 upon the tubular member, it being noted that the expansive tendency of the spring 14 will seat the respective packing rings 12 against the gland nut 8 and ring 15, whereby the packing rings 12 will be compressed longitudinally and expanded laterally to snugly and tightly engage the tubular member 9 and the walls of the stuffing box 4 to prevent leakage. Furthermore, the ring or retaining member 15 being secured upon the inner end of the tubular member 9, will prevent the tubular member 9 from being withdrawn, although the spring 14 will enable the pipe 1 and tubular member 9 to separate slightly if there is a tendency to pull them apart.

The tubular member 9 is adapted to be attached to a hydrant, supply pipe, or other water, air or other fluid conduit, and to this end, a socket nut 16 is mounted rotatably upon the protruding end portion of the tubular member 9, and the said end of the member 9 is provided with an outturned flange 17 within the socket nut 16. The socket nut 16 is adapted to be threaded onto the nozzle 18 of the hydrant or other conduit, and a gasket 19 is preferably disposed within the socket nut 16 to be compressed between the flange or lip 17 and the nozzle 18 when the member 9 is attached to the nozzle or member 18.

In assembling the present device, supposing all of the parts to be separated, the socket nut 16 is first slid upon the tubular member 9, and the gland nut 8, packing rings 12, bearing springs 13 and the spring 14 are in proper turn slid upon the tubular member 9. Finally, the retaining ring 15 is secured upon the tubular member 9 to hold the other parts upon the tubular member. The tubular member is then inserted into the stuffing box 4 with the packing rings 12 and accompanying parts and the gland nut 8 is then threaded into the mouth of the stuffing box 4. The reduced end 10 of the member 9 will then enter the enlarged portion 6 of the bore 5, which will enable the tubular member 9 and pipe 1 to move apart slightly, without withdrawing the reduced end portion 10 of the member 9 completely from the bore 5. The end portion 10 of the member 9 fitting telescopically into the bore 5 will serve as a primary means for preventing leakage. The tubular member 9 may then be attached to the nozzle or outlet 18 of a hydrant, or other conduit, through the medium of the socket nut 16, and the hose may be readily attached to the pipe 1, through the medium of the nipple or attaching member 2.

The arms of the pipe 1 being arranged angularly, will enable the hose to drop from the hydrant, or its equivalent, without the existence of the usual bend in the hose adjacent the hydrant, and furthermore, the pipe or member 1 may swing upon the tubular member 9, to permit the hose to be drawn about without interference or without the liability of breaking or rupturing the same. The present device therefore serves the two fold function, of eliminating the bend in the hose as usual, and for enabling the hose to move readily with respect to the hydrant or other object to which the hose is attached.

As above intimated, the spring 14 being disposed between the gland 8 through which the member 9 is slidable, and the retaining ring 15 which is secured upon the member 9, will hold the parts 1 and 9 together, although the spring will enable the said parts to separate slightly when the hose is subject to strain in moving the same about. The spring 14 will also compress the packing rings 12 so that they will tightly engage the tubular member 9 and the walls of the stuffing box 4, to prevent leakage.

In view of the foregoing, taken in connection with the drawing, the advantages and capabilities of the present device will no doubt be obvious to those versed in the art, without further comment being deemed necessary, it being understood that the present device may be constructed in various sizes, according to its various uses, and may be altered in its details within the scope of the appended claim, without departing from the spirit of the invention.

Having thus described the invention, what is claimed as new is:—

A coupler embodying an elbow having a counter-bore at one end, the bore of the elbow having a slightly enlarged portion at the bottom of the counter-bore, the elbow having a beveled annular seat between the said enlarged portion of the bore and the bottom of the counter-bore, a gland engaged into the mouth of the counter-bore, a tubular member slidable through the gland and having a reduced end fitting slidably and snugly in said enlarged portion of the bore and forming a beveled shoulder adapted to fit snugly against said seat, a ring secured upon the tubular member within the counter-bore and spaced from the bottom of the counter-bore, packing rings between and seating against the gland and ring, and an expansion spring disposed between the packing rings.

In testimony that I claim the foregoing as my own, I have hereto affixed my signature in the presence of two witnesses.

GEORGE P. FRANK.

Witnesses:
 RALPH H. LATIMER,
 M. T. WALSH, Jr.